(12) United States Patent
Nakagawa (10) Patent No.: US 6,218,750 B1
(45) Date of Patent: Apr. 17, 2001

(54) DRIVING DEVICE FOR POLYPHASE MOTOR

(75) Inventor: Masayoshi Nakagawa, Niigata-ken (JP)

(73) Assignee: ALPS Electric Co., Ltd., Tokyo (JP)

( * ) Notice: Subject to any disclaimer, the term of this patent is extended or adjusted under 35 U.S.C. 154(b) by 0 days.

(21) Appl. No.: 09/427,220

(22) Filed: Oct. 26, 1999

(30) Foreign Application Priority Data

Oct. 29, 1998 (JP) .................................................. 10-308216

(51) Int. Cl.[7] .......................... H02K 11/00; H01L 43/00; G01B 7/14
(52) U.S. Cl. ................ 310/68 B; 338/32 R; 324/207.21
(58) Field of Search .......................... 310/68 B, DIG. 6; 338/32 R; 324/207.21, 252

(56) References Cited

U.S. PATENT DOCUMENTS

| | | | |
|---|---|---|---|
| 4,403,187 | * | 9/1983 | Takahashi et al. .................... 324/208 |
| 4,628,259 | * | 12/1986 | Takahashi et al. .................... 324/208 |
| 4,639,807 | * | 1/1987 | Sekizawa et al. .................... 360/113 |
| 4,801,830 | * | 1/1989 | Ogino et al. ........................ 310/68 B |
| 5,422,569 | * | 6/1995 | Nakahara et al. .................... 324/174 |
| 5,477,143 | * | 12/1995 | Wu .................................. 324/207.21 |
| 5,574,364 | * | 11/1996 | Kajimoto et al. ................ 324/207.12 |
| 5,585,719 | * | 12/1996 | Endo et al. ........................... 324/235 |
| 5,610,457 | * | 3/1997 | Kurita ................................. 310/68 B |
| 5,841,276 | * | 11/1998 | Makino et al. .................. 324/207.21 |

FOREIGN PATENT DOCUMENTS 3-47466    9/1984    (JP) .

* cited by examiner

*Primary Examiner*—Elvin Enad
*Assistant Examiner*—Dang Dinh Le
(74) *Attorney, Agent, or Firm*—Brinks Hofer Gilson & Lione (57) ABSTRACT

Within a three-phase motor M, there are mounted one chip-shaped magnetoresistance effect element sensors comprising magnetoresistance effect elements having a spin-valve structure in series connected. The driving signal generating means generates difference signals obtained by subtracting output signals from each of the magnetoresistance effect element sensors. The phase current supplying means generates phase currents on the basis of the difference signals, and supplies these to driving coils for each phase respectively. The magnetoresistance effect element sensor is more excellent in temperature characteristic than the hole element, and is also high in output level, and therefore, the rotational speed and phase of the three-phase motor can be maintained with high accuracy.

8 Claims, 11 Drawing Sheets

DRIVING DEVICE FOR POLYPHASE MOTOR

BACKGROUND OF THE INVENTION

Detailed Description of the Invention

1. Technical Field of the Invention

The present invention relates to a driving device for a brushless motor that is having a polyphase structure, and more particularly to a driving device for a polyphase motor excellent in temperature characteristic and capable of simplifying the circuit structure through the use of a magnetoresistance effect element for a rotation detector.

2. Prior Art

Figure 14:
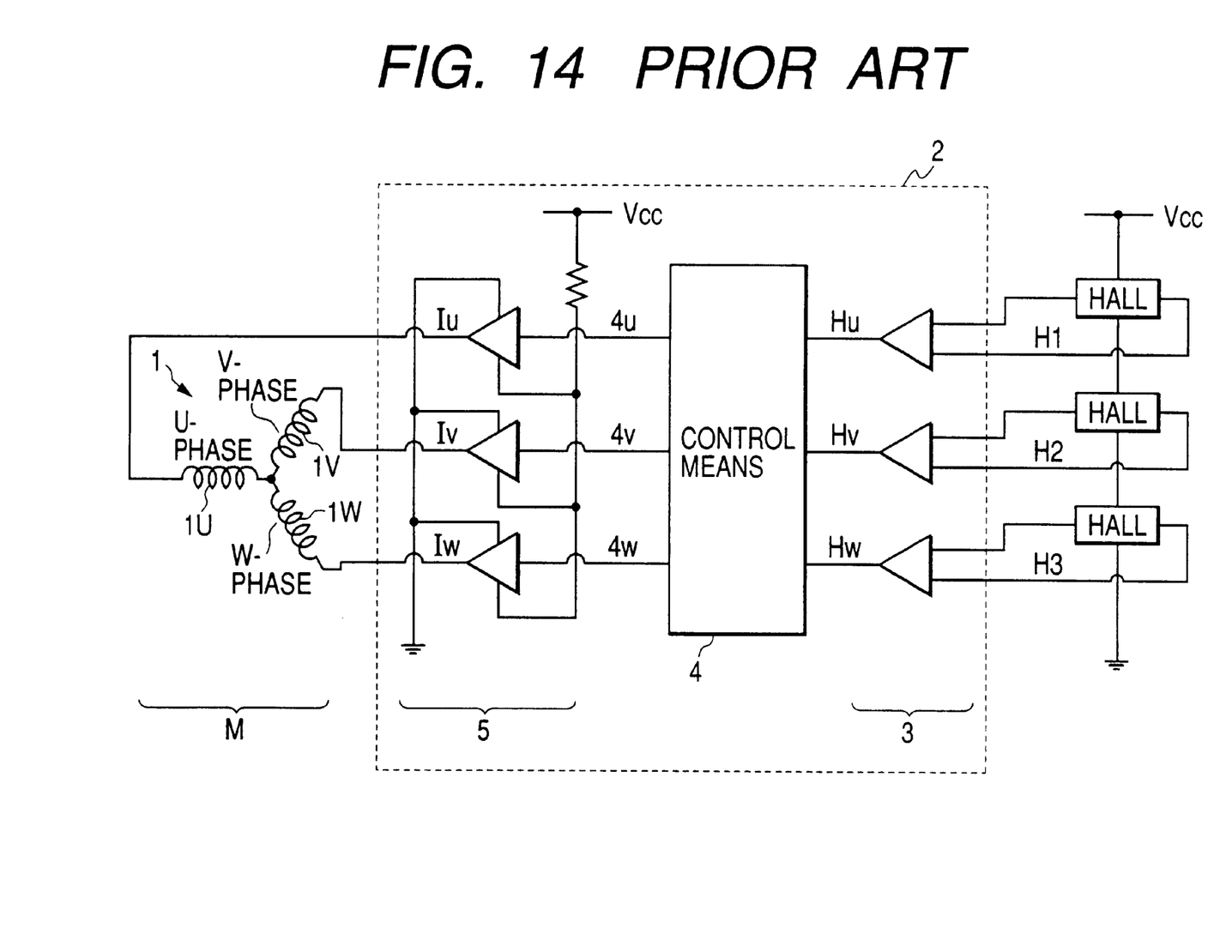
FIG. 14 is a structural view showing a driving device for a three-phase motor as an example of a conventional driving device for a polyphase motor.
Figure 15:
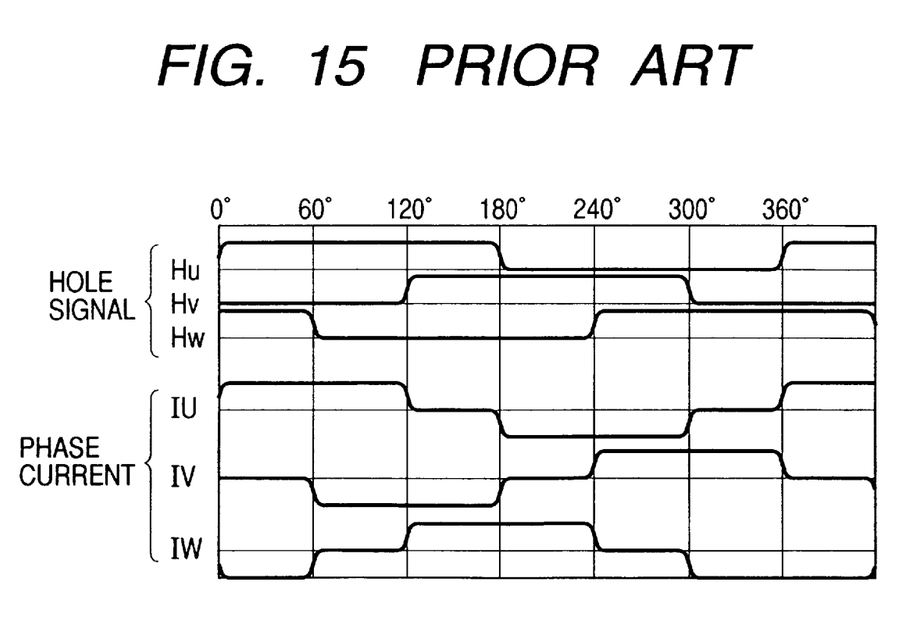
FIG. 15 is a view showing a timing chart for a Hall signal and phase current in FIG. 14.

FIG. 14 is a structural view showing a driving device for a three-phase brushless motor as an example of a conventional driving device for a polyphase motor, and FIG. 15 is a timing chart for the Hall signal and phase current in FIG. 14.

In FIG. 14, a reference numeral 1 designates a brushless three-phase motor consisting of driving coils 1U (U-phase), 1V (V-phase) and 1W (W-phase).

In this three-phase motor 1, a rotor is rotatably supported on a stator, which is located on the fixed portion side. The stator is provided with the driving coils 1U, 1V and 1W, and in positions adjacent these coils, with hole elements H1, H2 and H3 respectively. On the inner surface of a rotor case (not shown), there are provided ring-shaped rotor magnets, in which N-poles and S-poles are alternately arranged, and the Hall elements H1, H2 and H3 are provided in positions opposed to these rotor magnets respectively. When the rotor rotates, each magnetic pole of the rotor magnet passes the Hall elements H1, H2 and H3 respectively, and at this time, the Hall elements H1, H2 and H3 detect changes in the magnetic field.

Output signals from the Hall elements H1, H2 and H3 are inputted into driving means 2. As shown in FIG. 14, the driving means 2 comprises voltage follower means 3, control means 4 and phase current generating means 5.

By receiving the output signals from the Hall elements H1, H2 and H3 by a high-input impedance element consisting of an operational amplifier and the like, the voltage follower means 3 plays a part of accurately transmitting the output signals of the Hall signals to the control means 4 in the next stage. Also, within the control means 4, there is provided amplification means (not shown) to amplify the output signals from the Hall elements H1, H2 and H3 having a low signal level into such hole signals Hu, Hv and Hw which are prone to be signal-processed as shown in FIG. 15.

Also, the control means 4 generates driving signals 4u, 4v and 4w for which timing adjustment has been performed on the basis of each Hall signal Hu, Hv and Hw. Thus, in the phase current generating means 5, driving signals 4u, 4v and 4w are voltage-current converted into phase current Iu, Iv and Iw respectively. At this time, each phase current Iu, Iv and Iw is converted in line with the timing of the driving signals 4u, 4v and 4w respectively, and is supplied to each driving coil 1U, 1V and 1W of the three-phase motor 1.

In this manner, the construction of three-phase motor 1 makes it possible to always maintain the rotational speed and rotational phase of the rotor with high accuracy by performing feedback control in which the rotational speed and rotational phase of the rotor are detected to supply optimum phase current Iu, Iv and Iw to the driving coils 1U, 1V and 1W for each phase in real time.

Problems to be solved by the Invention

The driving device for the motor has, however, the following problem.

The Hall elements used in the foregoing include a chemical semiconductor such as InSb (indium antimony) and GaAs (gallium arsenic).

Generally, since the Hall element including InSb (indium antimony) has a defect in that it has large fluctuations in temperature characteristic, the problem results because it is difficult to maintain the rotational speed and phase of the rotor with high accuracy.

On the other hand, since it has a low output level although it has smaller fluctuations in temperature characteristic than InSb, the Hall element made of GaAs (gallium arsenic) requires means for amplifying the output signal from the Hall element. Therefore, the problem is that the structure of the motor driving device becomes complicated.

Also the problem exists that when a plurality of Hall elements are provided within a polyphase motor, the outside dimensions of the entire polyphase motor increase because the outside dimensions of the Hall element are prone to become comparatively large.

SUMMARY OF THE INVENTION

The present invention solves the above-described conventional problems, and its object is to provide a driving device for a polyphase motor that is excellent in temperature characteristic and capable of simplifying the structure of a motor driving device.

Also, it is another object of the present invention to provide a polyphase motor capable of preventing the outside dimensions of the polyphase motor itself from being increased.

Means for solving the Problems

The present invention comprises a polyphase motor whose rotor magnet rotates when each phase current is supplied to a stator having a plurality of driving coils; a magnetoresistance effect element sensor provided for each phase for detecting an output signal corresponding to the rotational phase of the rotor magnet; offset removing means for removing offset voltage contained in an output signal from the magnetoresistance effect element sensor; driving signal generating means for generating a difference signal between phases of the output signal corresponding to each phase, from which the offset voltage has been removed; and phase current supplying means for generating phase current which is applied to the driving coils for each phase on the basis of the driving signal.

A driving device for a polyphase motor according to the present invention is, for example, used for a three-phase brushless motor, and may be for a two-phase motor, a four-phase motor and the like in addition. Generally, the magnetoresistance effect element is capable of suppressing the power consumption because it has a higher output level than the Hall element. Or when the current consumption is set to the same degree the Hall element, the magnetoresistance effect element can be operated in a more stable state. Also, since the magnetoresistance effect element is capable of generating a high output signal to a very weak magnetic field, the rotor magnet can also be formed by a weakly magnetic material, and it becomes possible to supply a low-priced three-phase motor.

In a driving device for a polyphase motor according to the present invention, a magnetoresistance effect sensor is used for detecting rotational speed or rotational phase of a polyphase motor consisting of a plurality of phases, whereby it is possible to obtain a signal at a higher output level than when the Hall element is used. Accordingly, it becomes possible to control the polyphase motor from low-speed rotation to high-speed rotation with high accuracy.

In the foregoing, the magnetoresistance effect sensor is a sensor comprising a first magnetoresistance effect element and a second magnetoresistance effect element in series connected through an output unit at the mid-point. The first magnetoresistance effect element has a fixed magnetic layer magnetized in one direction and a free magnetic layer whose direction of magnetization fluctuates under the influence of an external magnetic field, while the second magnetoresistance effect element has a fixed magnetic layer magnetized in a direction opposite to the one direction and a free magnetic layer whose direction of magnetization fluctuates under the influence of the external magnetic field. The directions of magnetization of the fixed magnetic layers of the first and second magnetoresistance effect elements, which are opposite to each other, are set in parallel to the direction of the magnetic field of the rotor, and predetermined voltage is applied to the magnetoresistance effect elements in series connected. The offset removing means has preferably subtraction means for subtracting, from the voltage of the output unit at the mid-point, reference voltage to be set separately from the voltage.

By connecting such magnetoresistance effect elements as described above in series, it becomes possible to accurately detect a lead or a lag in the rotational speed or rotational phase of the motor by one magnetoresistance effect element sensor. Also, by removing a mid-point potential from the output signal from the magnetoresistance effect element sensor, it can be made into an output signal which oscillates with zero point as the center, and therefore, the signal processing thereafter becomes easier.

The directions of magnetization of the fixed magnetic layers of the first and second magnetoresistance effect elements are set in parallel to the direction of the magnetic field of the rotor, whereby the magnetic field of the rotor becomes parallel to the filmed surfaces of the magnetoresistance effect elements, and therefore, it is possible to change the magnetic reluctance value thereof in response to the change in the direction of the magnetic field.

Alternatively, the magnetoresistance effect element sensor comprises four magnetoresistance effect elements used and bridge-connected on a substrate, each of the four magnetoresistance effect elements having a fixed magnetic layer and a free magnetic layer whose direction of magnetization fluctuates under the influence of the external magnetic field; of two sets of magnetoresistance effect elements which are in opposed positional relationship to each other, one set of fixed magnetic layers are both magnetized in the same direction while the fixed magnetic layers of the remaining other set of magnetoresistance effect elements are both magnetized in a direction opposite to the fixed magnetic layers of the one set of the magnetoresistance effect elements; the directions of magnetization of the fixed magnetic layers of two sets of magnetoresistance effect elements, which are opposite to each other, are set in parallel to the direction of the magnetic field of the rotor, and predetermined voltage is applied to the magnetoresistance effect elements bridge-connected; and the offset removing means can be caused to have subtraction means for subtracting, from the mid-point potential of one series-connected portion of the magnetoresistance effect elements bridge-connected, the mid-point potential of the other series-connected portion.

More specifically, the magnetoresistance effect elements are bridge-connected, whereby it is possible to further enhance the output level of the output signal, and to obtain an output signal from which any offset voltage has been already removed, from the magnetoresistance effect element sensor bridge-connected. Therefore, the polyphase motor can be controlled with higher accuracy, and the need for the dedicated offset removing means can be eliminated.

The polyphase motor is, for example, a three-phase motor consisting of a U-phase, a V-phase and a W-phase, and the driving signal generating means generates, when any of the U-phase, V-phase and W-phase is set to a first phase, a difference signal between an output signal from the magnetoresistance effect element sensor obtained by detecting from this first phase and an output signal from the magnetoresistance effect element sensor obtained by detecting from the second phase, which is any of the U-phase, V-phase and W-phase, which is adjacent the first phase and lags the phase of this first phase by a phase difference of 120°.

Also, a driving device for a polyphase motor according to the present invention comprises: a polyphase motor whose rotor magnet rotates when each phase current is supplied to a stator having a plurality of driving coils; a magnetoresistance effect element sensor provided for each phase for detecting an output signal corresponding to the rotational phase of the rotor magnet; driving signal generating means for removing any offset voltage contained in an output signal from the magnetoresistance effect element sensor and for generating a difference signal between phases of the output signal corresponding to each phase; and phase current supplying means for generating phase current which is applied to the driving coils for each phase on the basis of the driving signal.

Removal of any offset signal contained in the output signal from the magnetoresistance effect element sensor and generation of a difference signal between phases of the output signal corresponding to each phase are performed at the same time in this manner, whereby it is possible to simplify the structure of the driving device for a polyphase motor.

For example, the polyphase motor is a three-phase motor consisting of a U-phase, a V-phase and a W-phase, and the magnetoresistance effect sensor is a sensor comprising a first magnetoresistance effect element and a second magnetoresistance effect element in series connected through an output unit at the mid-point. The first magnetoresistance effect element has a fixed magnetic layer magnetized in one direction and a free magnetic layer whose direction of magnetization fluctuates under the influence of the external magnetic field, while the second magnetoresistance effect element has a fixed magnetic layer magnetized in a direction opposite to the one direction and a free magnetic layer whose direction of magnetization fluctuates under the influence of the external magnetic field. The directions of magnetization of the fixed magnetic layers of the first and second magnetoresistance effect elements, which are opposite to each other, are set in parallel to the direction of the magnetic field of the rotor, and predetermined voltage is applied to the magnetoresistance effect elements connected in series. The driving signal generating means has, when any of the U-phase, V-phase and W-phase is set to a first phase, subtraction means for generating a difference signal between an output signal from the output unit at the mid-point of the magnetoresistance effect element sensor obtained by detecting from this first phase and the output signal from the magnetoresistance effect element sensor obtained by detecting from the second phase, which is any of the U-phase, V-phase and W-phase, which is adjacent the first phase and lags the phase of this first phase by a phase difference of 120°.

Also, the magnetoresistance effect element for use with the driving device for a polyphase motor is preferably of a spin-valve type element or tunnel MR type element.

More specifically, if the spin-valve type element or tunnel MR type element is used for the magnetoresistance effect element, it can be easily implemented to set the output polarity with respect to a change in angle of the external magnetic field to 180°, and the detection accuracy can be improved.

Also, serial connection or bridge connection in the magnetoresistance effect element enables the outside dimensions of the magnetoresistance effect element sensor to be reduced, and facilitates packaging into a polyphase motor because it can be constructed of one chip.

DETAILED DESCRIPTION OF PREFERRED EMBODIMENTS

Embodiments of the Invention

Hereinafter, with reference to the drawings, the description will be made of the present invention.

Figure 1:
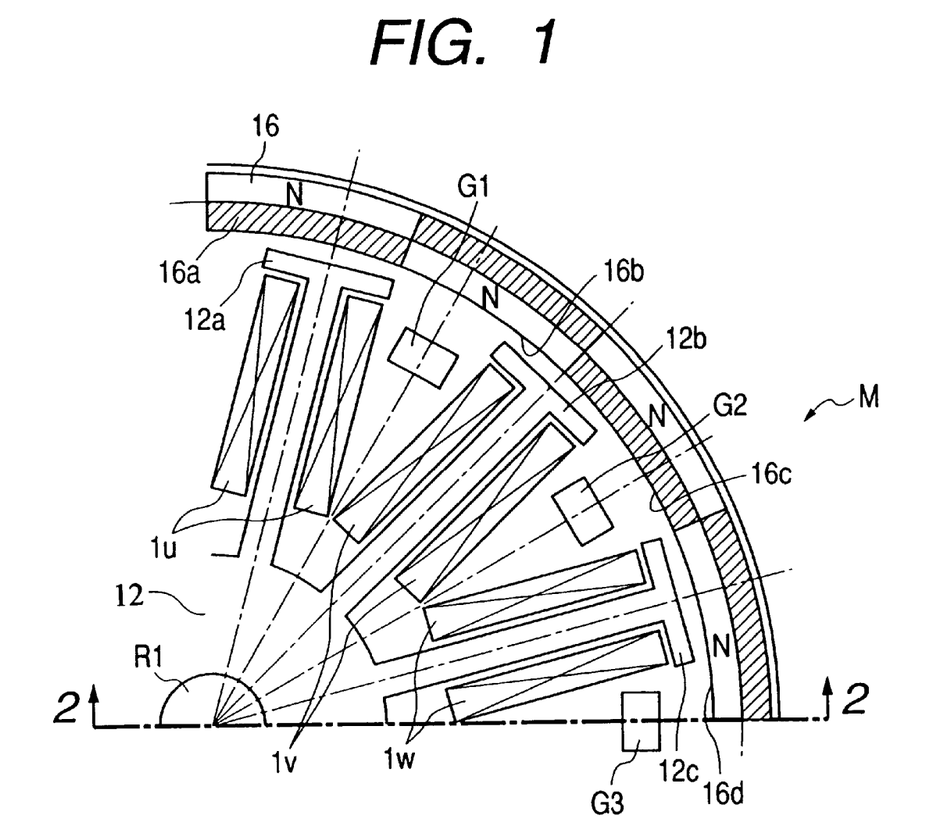
FIG. 1 is a partial plan view showing the structure of a three-phase motor as an example of layout for a magnetic sensor and a polyphase motor constituting the present invention.
Figure 2:
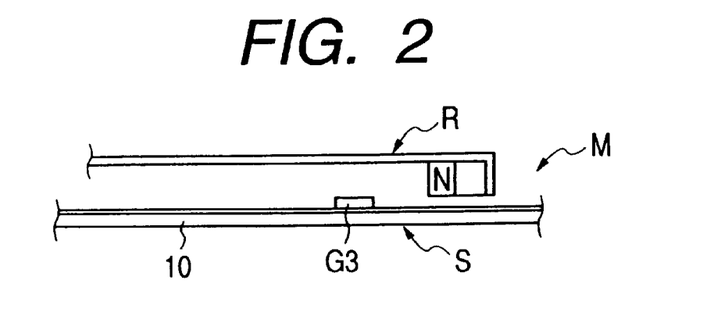
FIG. 2 is a sectional view taken on line 2—2 of FIG. 1.
Figure 3:
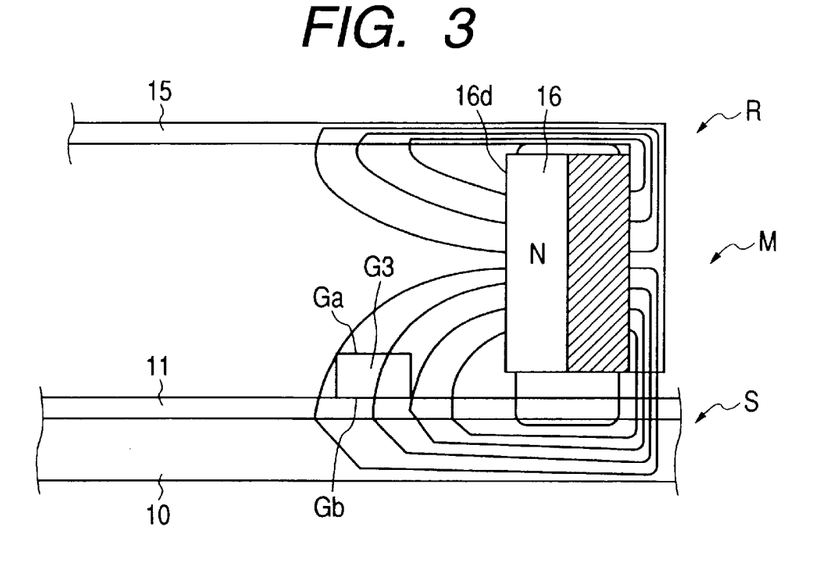
FIG. 3 is an enlarged view of FIG. 2 and a view showing a magnetic field near a magnetic sensor.

FIG. 1 is a partial plan view showing the structure of a three-phase brushless motor as an example of layout for a magnetoresistance effect element and a polyphase motor constituting the present invention, FIG. 2 is a sectional view taken on line 2—2 of FIG. 1, and FIG. 3 is an enlarged view of FIG. 2 and a view showing a magnetic field near the magnetoresistance effect element.

The three-phase motor M shown in FIG. 1 is a so-called flat rotor type brushless motor. As shown in FIG. 2, the three-phase motor M is roughly divided into a stator S on the fixed portion side, and a rotor R rotatably supported by a rotating shaft R1 with respect to this stator S.

A reference numeral 10 designates a lower yoke constituting a stator S, and is formed by magnetic material such as an iron plate. On the lower yoke 10, there are provided a printed board 11 and a bobbin 12. As shown in FIG. 1, the bobbin 12 is radially formed, and the tip ends of bobbin branches 12a, 12b and 12c are formed into a substantial T-shape. In the bobbin 12 shown in FIG. 1, the angle between each bobbin branch is 30°, and the bobbin 12 has 12 bobbin branches in total around the rotating shaft R1.

Also, each bobbin branch 12a, 12b and 12c is formed with each of driving coil 1U, 1V and 1W respectively. These driving coils 1U, 1V and 1W correspond to the U-phase, V-phase and W-phase of the three-phase motor respectively.

In this respect, in FIG. 1, the entire three-phase motor is divided into four pieces, a portion of ¼ thereof is shown, and the other ¾ portions also have the same structure as described above. Therefore, the polyphase motor shown in FIG. 1 is a so-called three-phase four-pole type three-phase motor.

On the printed board 11 on the side of the stator S, there is packaged a magnetic sensor G (G1, G2 and G3). The magnetic sensor G is, for example, a magnetoresistance effect element (GMR element), and has a spin-valve structure or a tunnel MR structure as described later. The magnetic sensor G1 is provided, for example, between the driving coil 1U and the driving coil 1V. The magnetic sensor G2 is provided between the driving coil 1V and the driving coil 1W, and the magnetic sensor G3 is provided between the driving coil 1W and the driving coil 1U (not shown) at an equal angle of 30° respectively.

On the other hand, the rotor R comprises a shallow cup-shaped upper yoke, and a ring-shaped rotor magnet 16 is mounted to the peripheral edge portion of the upper yoke. In this respect, the upper yoke is formed of magnetic material such as an iron plate as in the case of the lower yoke.

In the rotor magnet 16 shown in FIG. 1, its annular portion is divided into 16 pieces at an equal angle (22.5°). After the division, the inner peripheral surfaces 16a, 16b,...., 16p of the rotor magnet 16 are magnetized so that the magnetic poles adjacent each other are different in polarity. For example, in FIG. 1, the inner peripheral surfaces 16a and 16c of the rotor magnet 16 are magnetized to S-pole while the inner peripheral surfaces 16b and 16d are magnetized to N-pole.

When the rotor R rotates, each of the inner peripheral surfaces 16a, 16b, ..., 16p of the rotor magnet 16 passes each magnetic sensor G1, G2 and G3 sequentially. In a case where, for example, the inner peripheral surface 16d (N-pole) of the rotor magnet 16 passes the magnetic sensor G3 as shown in FIG. 3, such a magnetic field as shown in the same figure is formed between them. More specifically, a closed magnetic circuit is formed between N-pole, the lower yoke 10 and S-pole on the stator S side, while a closed magnetic circuit is formed between N-pole, the upper yoke 15 and S-pole on the rotor R side. On the stator S side, the external magnetic field of the rotor magnet 16 passes through the upper surface Ga and the lower surface Gb of the magnetic sensor G.

Figure 4:
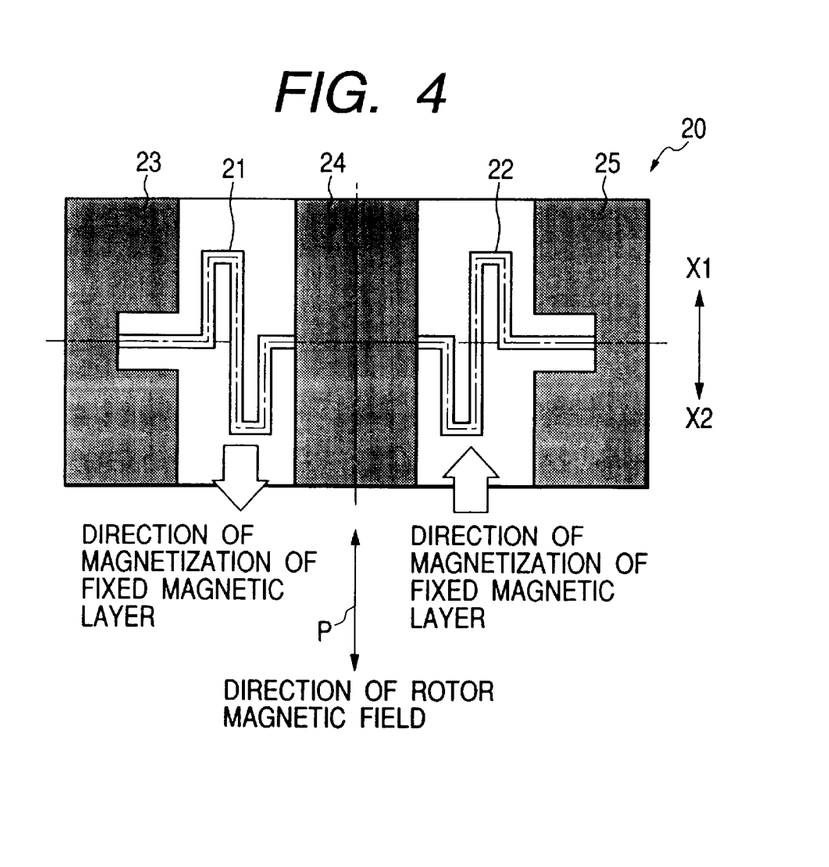
FIG. 4 is a plan view showing the structure of a first magnetoresistance effect element sensor as a magnetic sensor.
Figure 5:
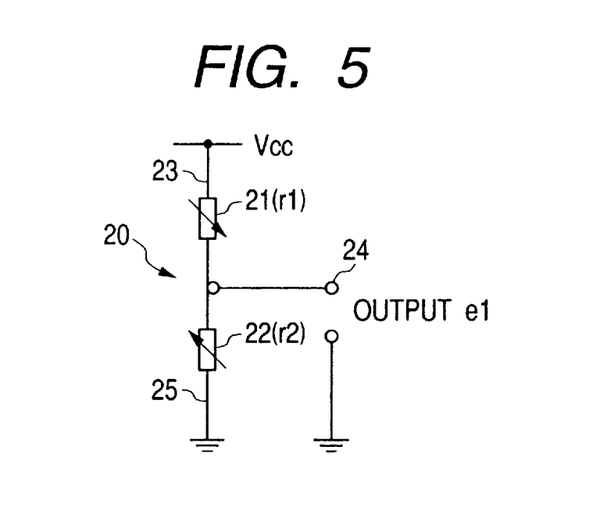
FIG. 5 is an equivalent circuit diagram of FIG. 4.
Figure 6:
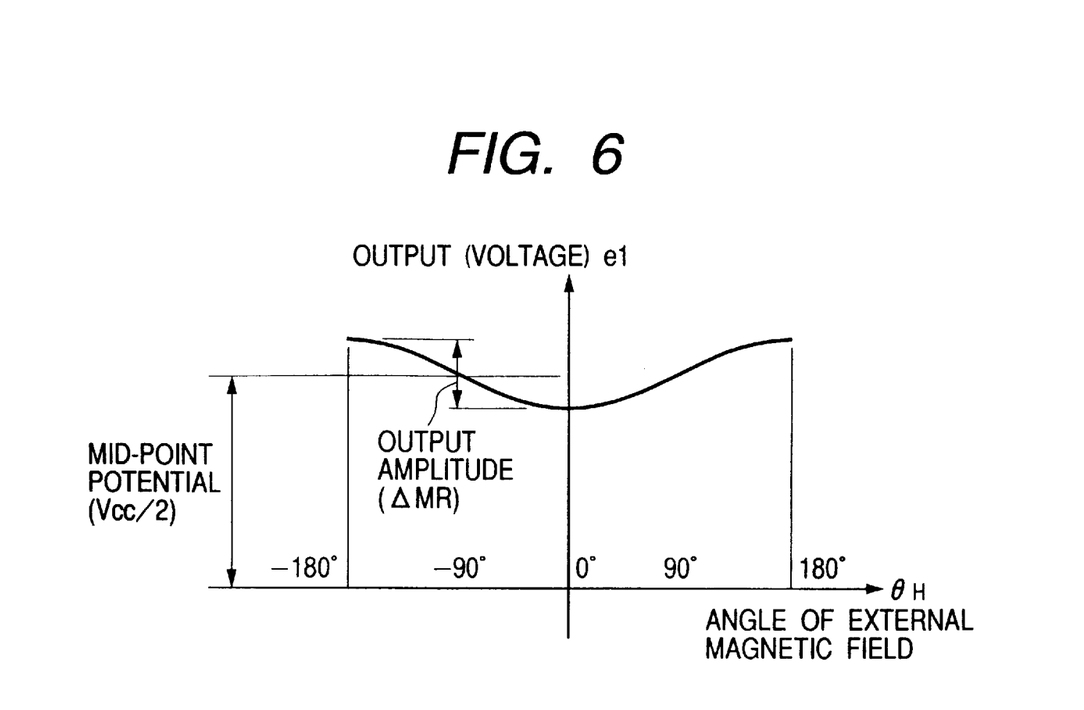
FIG. 6 is an output characteristic diagram for the magnetoresistance effect element sensor of FIG. 4.

FIG. 4 is a plan view showing the structure of a first magnetoresistance effect element sensor as a magnetic sensor, FIG. 5 is an equivalent circuit diagram of FIG. 4 and FIG. 6 is an output characteristic diagram for the magnetoresistance effect element sensor.

The magnetoresistance effect element sensor 20 shown in FIG. 4 is formed in chip form, and has a first magnetoresistance effect element 21 and a second magnetoresistance effect element 22. One end of the first magnetoresistance effect element 21 is connected to a land portion 23 for connection by soldering, and one end of the second magnetoresistance effect element 22 is connected to a land portion 25. The other ends of both magnetoresistance effect elements 21 and 22 are connected to a common land portion 24. In other words, the first magnetoresistance effect element 21 and the second magnetoresistance effect element 22 are connected in series through the land portion 24.

In this respect, the directions of arrows shown at positions adjacent each magnetoresistance effect element shown in FIG. 4 indicate the direction of magnification of a fixed magnetic layer which each magnetoresistance effect element has. More specifically, the magnetoresistance effect element sensor 20 has the spin-valve structure or the tunnel MR structure, and the fixed magnetic layer of the first magnetoresistance effect element 21 and the fixed magnetic layer of the second magnetoresistance effect element 22 are formed so that their direction of magnification (X2 direction) and direction of magnification (X1 direction) are opposite to each other.

When the magnetoresistance effect element sensors 20 constructed as described above are arranged at positions G1, G2 and G3 shown in FIG. 1, they can be made into a magnetic sensor very excellent in characteristic. Since, however, they have their magnetic reluctance values changed only by means of a magnetic field parallel to the filmed surface, the magnetoresistance effect elements 21 and 22 are arranged so that the direction of each of their filmed surfaces is parallel to the printed board 11 (See FIG. 3). More specifically, the direction of the magnetic field of the rotor magnet applied to each of the magnetoresistance effect element sensors 20 and 22 is P in FIG. 4. The direction P of this magnetic field is set in parallel to the direction of magnification (X2 direction) of the fixed magnetic layer of the first magnetoresistance effect element 21 and the direction of magnification (X1 direction) of the fixed magnetic layer of the second magnetoresistance effect element 22.

In this respect, the above-described chip-shaped magnetoresistance effect element sensor 20 has dimensions of 1 mm×about 2 mm, and this outer diameter dimension is very small. Therefore, by mounting such a small-sized magnetoresistance effect element sensor 20, it is possible to prevent the outside dimensions of the entire polyphase motor from being increased.

In the magnetoresistance effect element sensor 20 shown in FIG. 4, when the rotor R is caused to rotate in a state in which predetermined supply voltage Vcc is applied between the land portion 23 and the land portion 25 thereof as shown in FIG. 5, such output characteristic as shown in FIG. 6 can be obtained from the land portion 24 which serves as the output terminal. The output signal e1 shown in FIG. 6 is a cosine wave having output amplitude, of ΔMR1, with a mid-point potential (Vcc/2) corresponding to ½ the supply voltage Vcc being centered, and this output amplitude level is higher than the level of the Hall element.

As shown in FIG. 6, the output e1 from the magnetoresistance effect element sensor 20 fluctuates depending upon an angle θH of the external magnetic field which changes in response to the rotation of the rotor R. In the magnetoresistance effect element sensor 20, since the first magnetoresistance effect element 21 and the second magnetoresistance effect element 22, which have fixed magnetic layers magnetized in the directions opposite to each other respectively, are in series connected, the sum of all resistance values consisting of a magnetic reluctance value r1 of the first magnetoresistance effect element 21 and a magnetic reluctance value r2 of the second magnetoresistance effect element 22 is always maintained constant (r1+r2=constant). The output signal e1 follows a partial pressure ratio (e1=r2/(r1+r2)×Vcc) based on the magnetic reluctance value r1 of the first magnetoresistance effect element 21 and the magnetic reluctance value r2 of the second magnetoresistance effect element 22, and this partial pressure ratio fluctuates depending upon the angle θH of the external magnetic field acting on the magnetoresistance effect element sensor 20. More specifically, if, for example, the external magnetic field acts so as to increase the magnetic reluctance value r1 of the first magnetoresistance effect element 21 by Δr, the magnetic reluctance value r2 of the second magnetoresistance effect element 22 is decreased by Δr at the same time by means of the external magnetic field, and therefore, a relationship of r1+r2=constant remains maintained.

Figure 7:
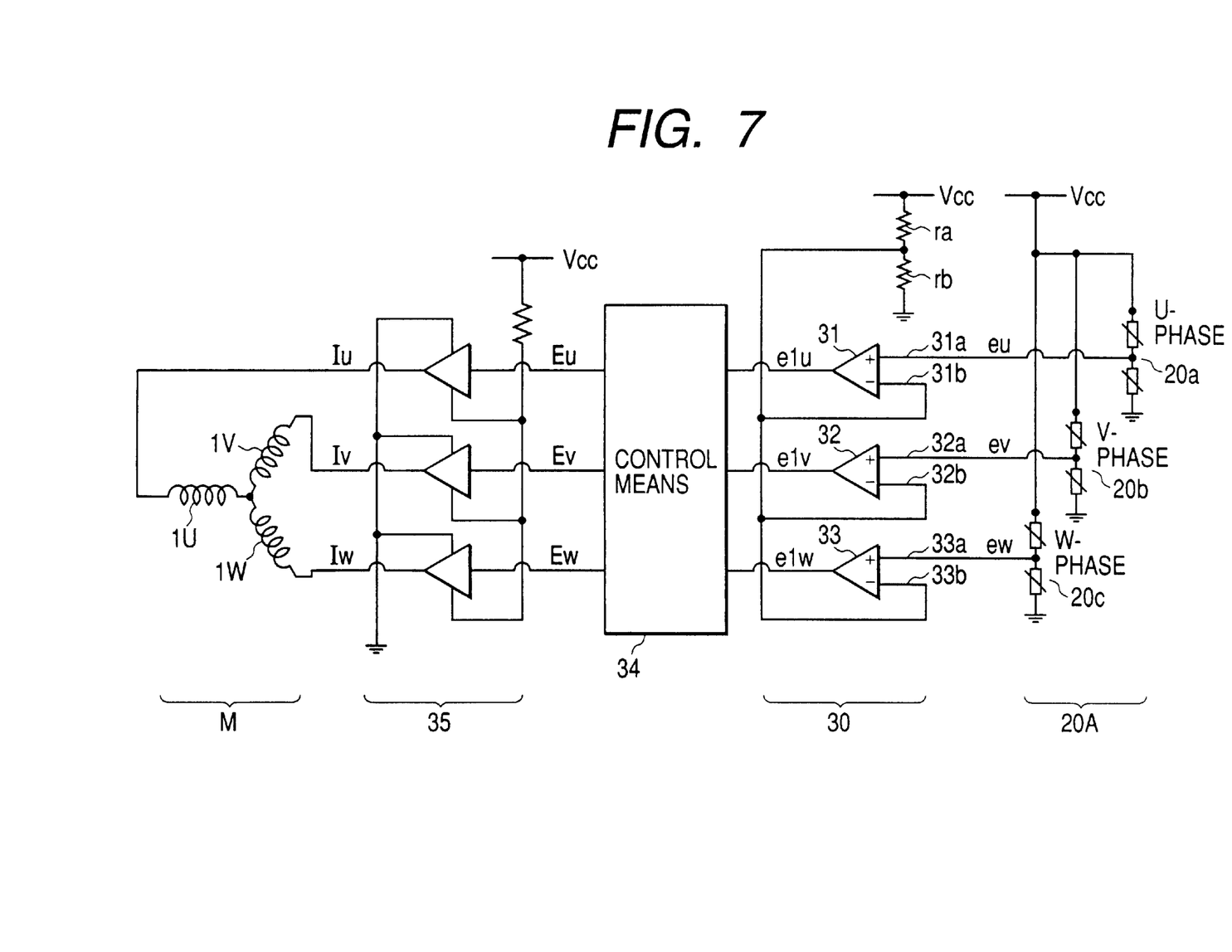
FIG. 7 is a structural view showing a first embodiment of a driving device for a three-phase motor.
Figure 8:
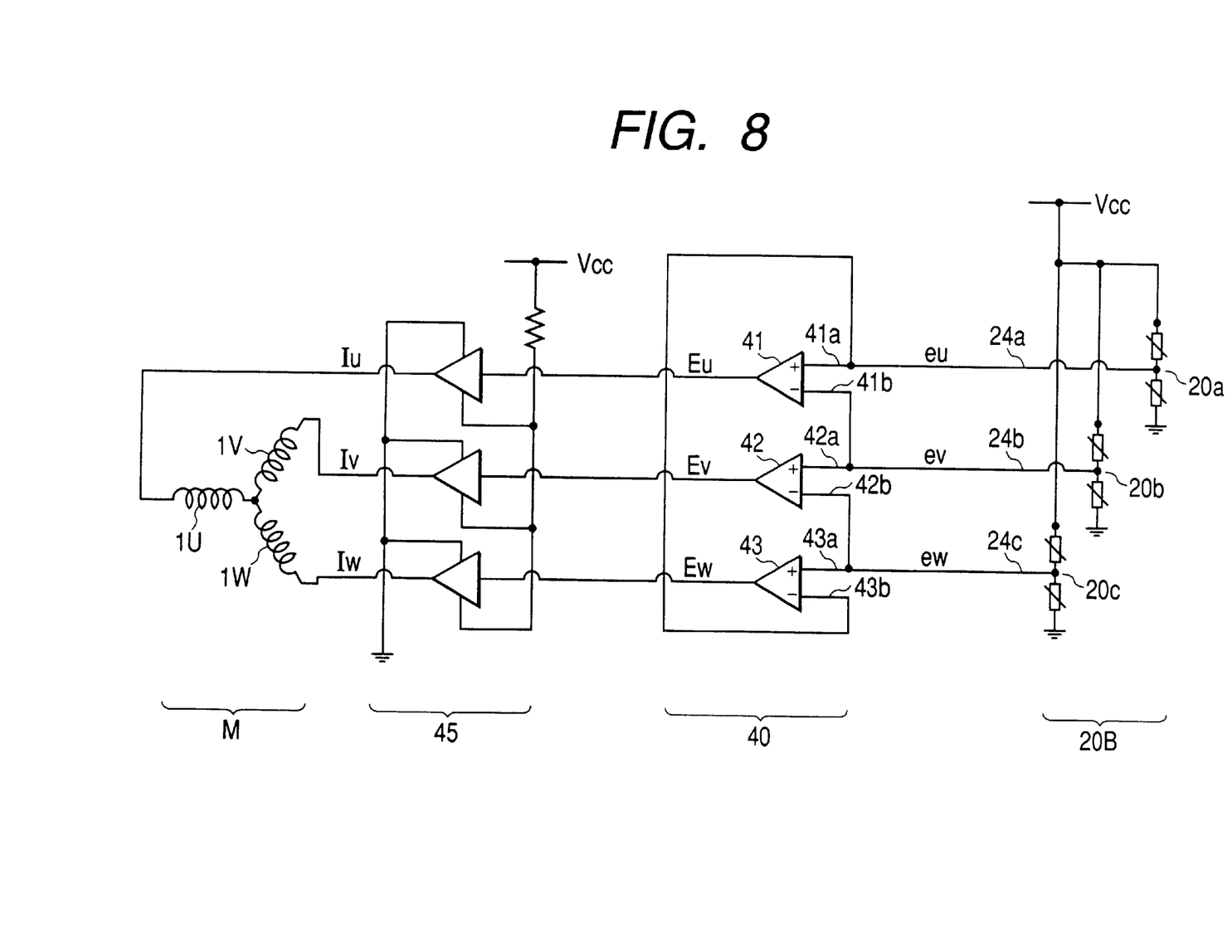
FIG. 8 is a structural view showing a second embodiment of a driving device for a three-phase motor.
Figure 9:
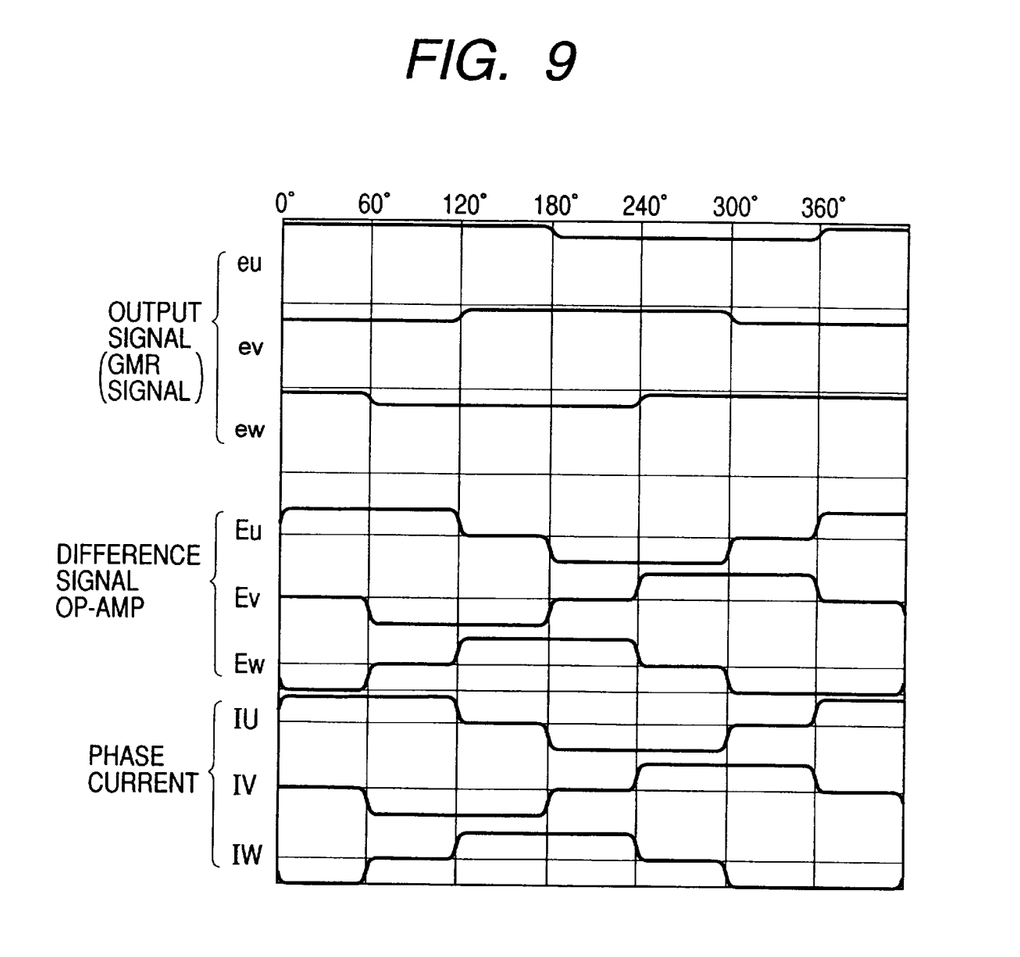
FIG. 9 is a view showing a timing chart for a driving device for a three-phase motor of FIG. 8.

FIG. 7 is a structural view showing a first embodiment of a driving device for a three-phase motor using a magnetoresistance effect element sensor, FIG. 8 is a structural view showing a second embodiment thereof, and FIG. 9 is a timing chart in the driving device of FIG. 8.

An offset voltage corresponding to a mid-point potential (Vcc/2) has been superimposed on the output signal e1 from the magnetoresistance effect element 20 shown in FIG. 6 in advance. In contrast, the output signals (Hall signals) Hu, Hv and Hw from the Hall element do not contain such offset voltage (See FIG. 15). Therefore, the output signal e1 from the magnetoresistance effect element sensor 20 cannot be directly inputted into the driving means 2 shown in FIG. 14. Thus, such means as shown in, for example, FIG. 7 or FIG. 8 can be taken.

The driving device shown in FIG. 7 comprises: detection means 20A; offset removing means 30; control means 34; and phase current supplying means 35. In this respect, the control means 34 and the phase current supplying means 35 have the same structure as the control means 4 and the phase current supplying means 5 shown in the FIG. 14.

The detection means 20A is constructed of the same magnetoresistance effect element sensor 20 as in FIG. 4, and each of the magnetoresistance effect element sensors 20a, 20b and 20c is mounted to the stator S side in the same manner as in FIG. 1. The structure is arranged so that the magnetoresistance effect element sensor 20a detects the rotational speed and phase corresponding to the U-phase, the magnetoresistance effect element sensor 20b detects the rotational speed and phase corresponding to the V-phase, and the magnetoresistance effect element sensor 20c detects the rotational speed and phase corresponding to the W-phase.

The offset removing means 30 is a differential input type subtracter constructed of an operational amplifier and the like, and the output terminals (land portion 24) from each of the magnetoresistance effect element sensors 20a, 20b and 20c in the detection means 20A are connected to each of non-inversion input terminals 31a, 32a and 33a of each subtracter 31, 32 and 33 respectively. On the other hand, voltage (rb/(ra+rb)·Vcc) obtained by dividing the supply voltage Vcc by resistance ra and rb is inputted into each of the inversion input terminals 31b, 32b, 33b of the subtracters 31, 32 and 33. However, the resistances ra and rb are set to the same resistance value (ra=rb), and the voltage after division is Vcc/2. More specifically, the input voltage to each of the inversion input terminals 31b, 32b and 33b is set to the same potential as the mid-point potential (Vcc/2). Therefore, the offset removing means 30 is capable of removing the mid-point voltage (Vcc/2) from each output signal eu, ev and ew of each of the magnetoresistance effect element sensors 20a, 20b and 20c. At this time, each output signal e1u, e1v and e1w from each of the subtracters 31, 32 and 33, from which the mid-point potential (Vcc/2) has been removed, becomes a cosine wave having output amplitude of ΔMR with zero point as a reference, and this is the same as the Hall element signal shown in FIG. 15.

Therefore, it becomes possible to input each output signal e1u, e1v and e1w from each of the subtracters 31, 32 and 33 into the same control means 34 as the control means 4 of the conventional driving means 2 respectively. Thus, in a phase current generating unit 35, optimum phase current is generated in each driving coil as in the case of the Hall element, and the rotational speed and phase of the three-phase motor can be controlled with high accuracy.

In this respect, since the output amplitude level of each output signal e1u, e1v and e1w from each of the subtracters 31, 32 and 33 is higher than that of the Hall element, it is not necessary to provide any amplifying means in the latter stage of the detection means 20A. Further, the magnetoresistance effect element sensor 20 can detect the rotational speed and phase with higher accuracy than when the Hall element is used because the magnetoresistance effect element sensor 20 is characterized by the fact that it has small fluctuations in temperature characteristic.

Next, the description will be made of a second embodiment of a driving device for a polyphase motor shown in FIG. 8.

FIG. 8 shows a driving device for a three-phase motor, which comprises detection means 20B, driving signal generating means 40 and phase current supplying means 45.

The detection means 20B is constructed of the same magnetoresistance effect element sensors 20a, 20b and 20c as shown in FIG. 4. Also, the driving signal generating means 40 is constructed of differential input type subtracters 41, 42 and 43. An output terminal 24a (land portion 24) of the magnetoresistance effect element sensor 20a is connected to a non-inversion input terminal 41a of the subtracter 41, and an output terminal 24b of the magnetoresistance effect element sensor 20b is connected to an inversion input terminal 41b. Similarly, an output terminal 24b of the magnetoresistance effect element sensor 20b is connected to a non-inversion input terminal 42a of the subtracter 42, and an output terminal 24c of the magnetoresistance effect element sensor 20c is connected to an inversion input terminal 42b. Further, an output terminal 24c of the magnetoresistance effect element sensor 20c is connected to a non-inversion input terminal 43a of the subtracter 43, and an output terminal 24a of the magnetoresistance effect element sensor 20a is connected to an inversion input terminal 43b. Each output Eu, Ev and Ew of the subtracter 41, 42 and 43 is connected to phase current supplying means 45, and output (phase current) Iu, Iv and Iw of the phase current supplying means 45 is connected to driving coils 1U, 1V and 1W of each phase of the three-phase motor M respectively.

The operation of a driving device for a three-phase motor of FIG. 8 will be described with reference to the timing chart shown in FIG. 9.

Reference numerals eu, ev and ew in FIG. 9 designate output signals (GMR signals) of each of the magnetoresistance effect element sensors 20a, 20b and 20c in the detection means 20B shown in FIG. 8. When a rotor R provided for the three-phase motor M rotates, output signals eu, ev and ew, whose phases are 120° different from one another, are outputted from the magnetoresistance effect element sensors 20a, 20b and 20c respectively. As described above, each of the output signals eu, ev and ew contains an offset signal.

Each output signal eu, ev, ew is subtracted between each signal in the subtracters 41, 42 and 43 in the driving signal generating means 40 to generate difference signals (driving signals) Eu, Ev and Ew shown in FIG. 9. More specifically, in the subtracter 41, a difference (eu minus ev) between output signals eu and ev of the magnetoresistance effect element sensors 20a and 20b corresponding to U-phase and V-phase, which are adjacent each other, is outputted as a difference signal Eu. Similarly, in the subtracter 42, a difference (ev minus ew) between output signals ev and ew of V-phase and W-phase, which are adjacent each other, is outputted as a difference signal Ev, and in the subtracter 43, a difference (ew minus eu) between output signals ew and eu of W-phase and U-phase, which are adjacent each other, is outputted as a difference signal Ew.

In the driving device for a three-phase motor shown in FIG. 8, by taking difference signals (driving signals) Eu, Ev and Ew between output signals of two phases, which are adjacent each other, (between eu and ev, between ev and ew, or between ew and eu) in this manner, it is possible to remove offset voltage (mid-point potential) contained in output signals (GMR signals) eu, ev and ew of each of the magnetoresistance effect element sensors 20a, 20b, 20c as shown in FIG. 9. In the driving signal generating means 40, it is possible to generate each difference signal (driving signal) Eu, Ev and Ew at such timing as shown in FIG. 9 from the output signals eu, ev and ew. Therefore, in phase current supplying means 45 in the next stage, there are generated phase current Iu, Iv and Iw based on the timing of these difference signals (driving signals) Eu, Ev and Ew. The phase currents Iu, Iv and Iw generated at such timing are supplied to the driving coils 1U, 1V and 1W respectively, whereby the rotational speed and phase of the three-phase motor can be maintained with high accuracy.

In the driving device for a three-phase motor shown in FIG. 8, it is not necessary to take such a structure that offset voltage (mid-point potential) is removed from the output signals (GMR signals) eu, ev and ew of each magnetoresistance effect element sensor in advance and thereafter, each of difference signals Eu, Ev and Ew is generated unlike the first embodiment shown in FIG. 7. In other words, removal of each offset signal (mid-point potential) and generation of each difference signal (driving signal) with timing adjusted can be performed at the same time. Therefore, by the adoption of the driving device shown in FIG. 8, the offset removing unit 30 can be removed from the structure of the driving device shown in FIG. 7, and the structure of the entire driving device for a three-phase motor can be simplified.

Next, the description will be made of a second embodiment of the magnetoresistance effect element sensor.

Figure 10:
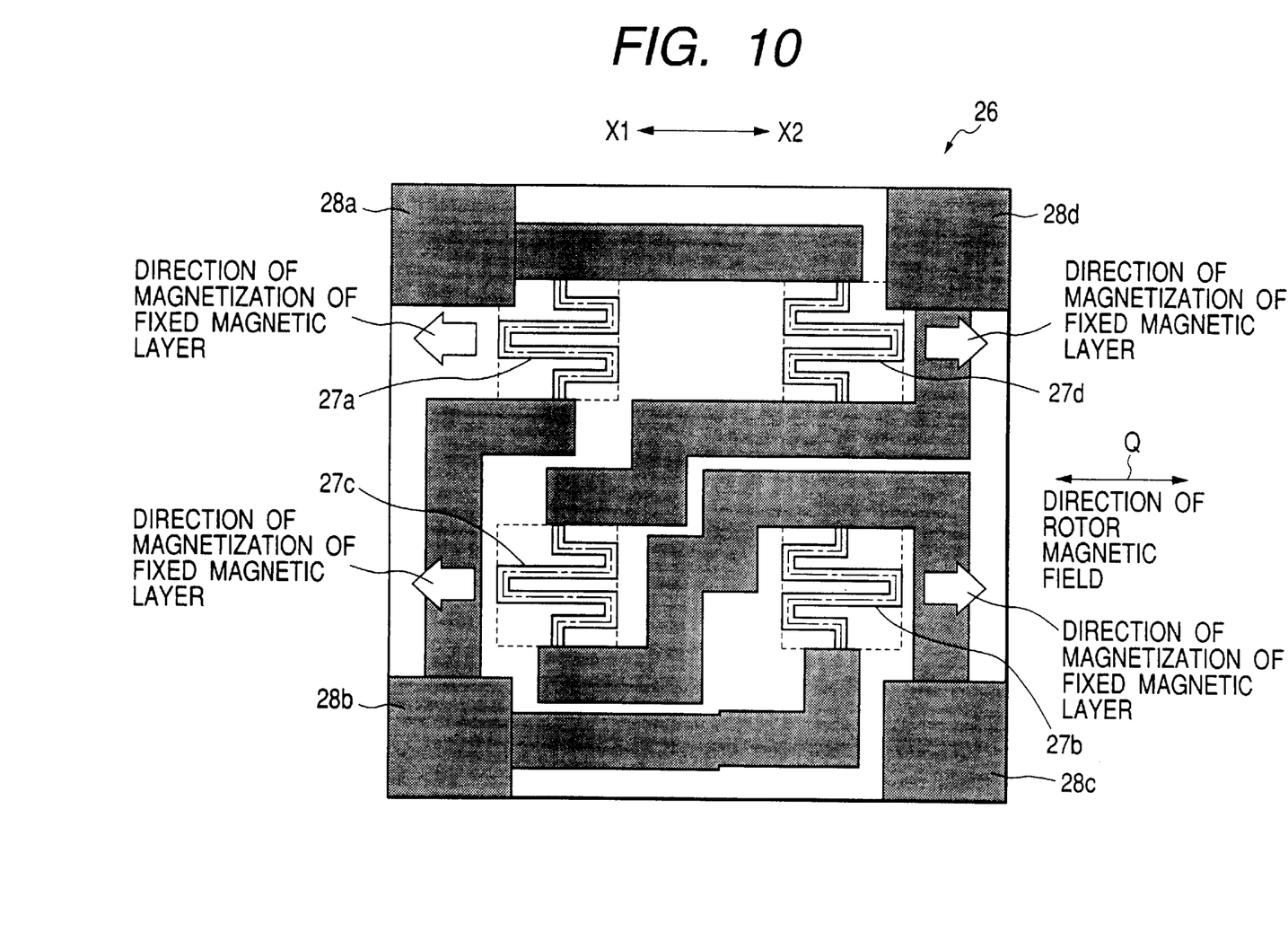
FIG. 10 is a plan view showing the structure of a second magnetoresistance effect element sensor.
Figure 11:
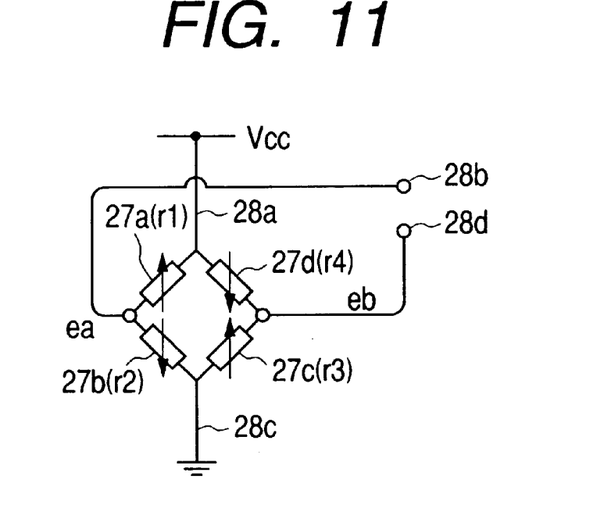
FIG. 11 is an equivalent circuit diagram of FIG. 10.
Figure 12:
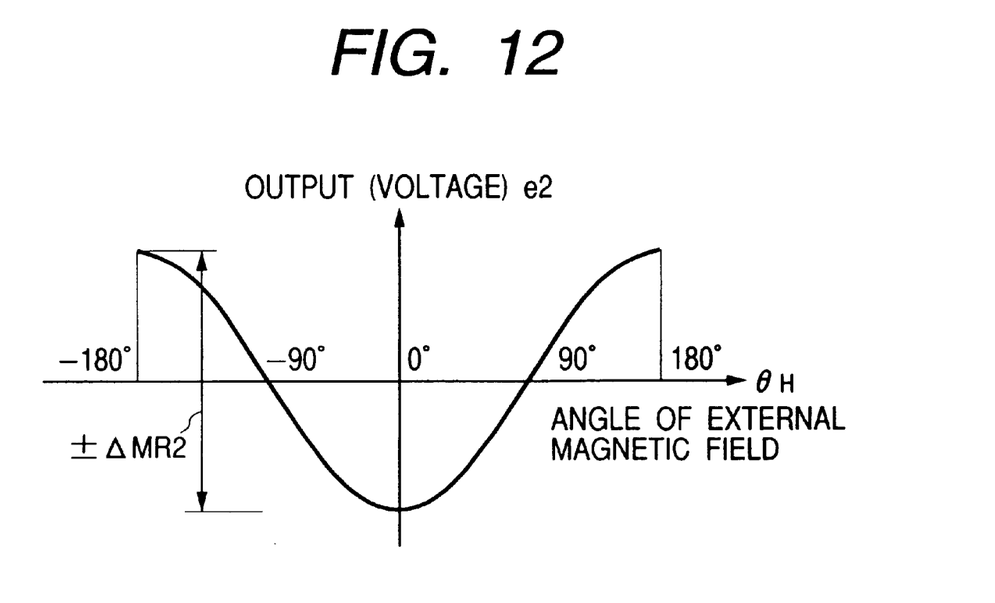
FIG. 12 is an output characteristic diagram for the magnetoresistance effect element sensor of FIG. 10.

FIG. 10 is a plan view showing the structure of a second magnetoresistance effect element sensor as a magnetic sensor, FIG. 11 is an equivalent circuit diagram of FIG. 10, and FIG. 12 is an output characteristic diagram for the magnetoresistance effect element sensor shown in FIG. 10.

The magnetoresistance effect element sensor shown in FIG. 10 is obtained by forming a chip on a substrate, and has land portions 28a, 28b, 28c and 28d for connecting by soldering. A first magnetoresistance effect element 27a is provided between land portions 28a and 28b, a second magnetoresistance effect element 27b is provided between land portions 28b and 28c, a third magnetoresistance effect element 27c is provided between land portions 28c and 28d, and a fourth magnetoresistance effect element 27d is provided between land portions 28d and 28a. In other words, each of the first, second, third and fourth magnetoresistance effect elements 27 (27a, 27b, 27c and 27d) is bridge-connected.

In the magnetoresistance effect element sensor 26 shown in FIG. 10, the first magnetoresistance effect element 27a and the third magnetoresistance effect element 27c (a first set), which are provided in face-to-face relationship with each other, have fixed magnetic layers both magnetized in the same direction (X1 direction), while the remaining second magnetoresistance effect element 27b and the fourth magnetoresistance effect element 27d (a second set), which are provided in face-to-face relationship, have fixed magnetic layers both magnetized in the same direction (X2 direction). The direction of magnetization (X1 direction) of the fixed magnetic layer of the first set of magnetoresistance effect element (the first magnetoresistance effect element 27a and the third magnetoresistance effect element 27c) is opposite to the direction of magnetization (X2 direction) of the fixed magnetic layer of the second set of magnetoresistance effect element (the second magnetoresistance effect element 27b and the fourth magnetoresistance effect element 27d).

In FIG. 10, the direction Q of the magnetic field caused from the rotor R of the polyphase motor is set to be in parallel to each direction of magnetization (X1 and X2 directions) of the fixed magnetic layer of each magnetoresistance effect element 27 (27a, 27b, 27c and 27d).

In this respect, the magnetoresistance effect element sensor 26 having four magnetoresistance effect elements has as small outside dimensions as 2 mm×about 2 mm, and it is possible to prevent the outside dimensions of the entire polyphase motor from being increased even if a plurality of the magnetoresistance effect element sensors 26 are mounted within the polyphase motor.

In the magnetoresistance effect element sensor 26, when the rotor R is caused to rotate in a state in which predetermined supply voltage Vcc is applied between the land portion 28a and the land portion 28c thereof, such output characteristic as shown in FIG. 12 can be obtained from the land portions 28b and 28d. The output signal e2 shown in FIG. 12 is a cosine wave having an output amplitude with zero level being centered, of ΔMR2 because the magnetoresistance effect elements are bridge-connected. The output signal e2 (output amplitude is ΔMR2) is twice (e2=2·e1, ΔMR2=2·ΔMR1) the magnetoresistance effect element sensor 20 in FIG. 4.

When the magnetoresistance effect element sensor 26 (bridge-connected) is in an equilibrium state, each magnetic reluctance value of the magnetoresistance effect elements 27a, 27b, 27c and 27d is equal. In the same manner as described above, the sum of all resistance values consisting of a magnetic reluctance value r1 of the first magnetoresistance effect element 27a and a magnetic reluctance value r2 of the second magnetoresistance effect element 27b is always maintained constant (r1+r2=constant). At the same time, the sum of all resistance values consisting of a magnetic reluctance value r3 of the third magnetoresistance effect element 27c and a magnetic reluctance value r4 of the fourth magnetoresistance effect element 27d is also maintained constant (r3+r4=constant). Therefore, output ea between the land portion 28b and the land portion 28c is a partial pressure ratio (ea=r2/(r1+r2)×Vcc) based on the magnetic reluctance value r1 of the first magnetoresistance effect element 27a and the magnetic reluctance value r2 of the second magnetoresistance effect element 27b. Also, output eb between the land portion 28d and the land portion 28c is a partial pressure ratio (eb=r3/(r3+r4)×Vcc) based on the magnetic reluctance value r3 of the third magnetoresistance effect element 27c and the magnetic reluctance value r4 of the fourth magnetoresistance effect element 27d. However, the first and third magnetoresistance effect elements 27a and 27c (first set), and the second and fourth magnetoresistance effect elements 27b and 27d (second set) are fixed magnetic layers having directions of magnetization opposite to each other. Therefore, if, for example, the external magnetic field acts so as to increase the magnetic reluctance value r1, r3 of the first set (first and third magnetoresistance effect elements 27a and 27c) by Δr, the magnetic reluctance value r2, r4 of the second set (second and fourth magnetoresistance effect elements 27b and 27c) is decreased by Δr at the same time by means of the external magnetic field. Therefore, when the external magnetic field acts on the magnetoresistance effect element sensor 26, a potential difference is caused between the output ea of the land portion 28b and the output eb of the land portion 28d. This potential difference (ea minus eb) is outputted as an output signal e2 between the land portion 28b and the land portion 28d.

Figure 13:
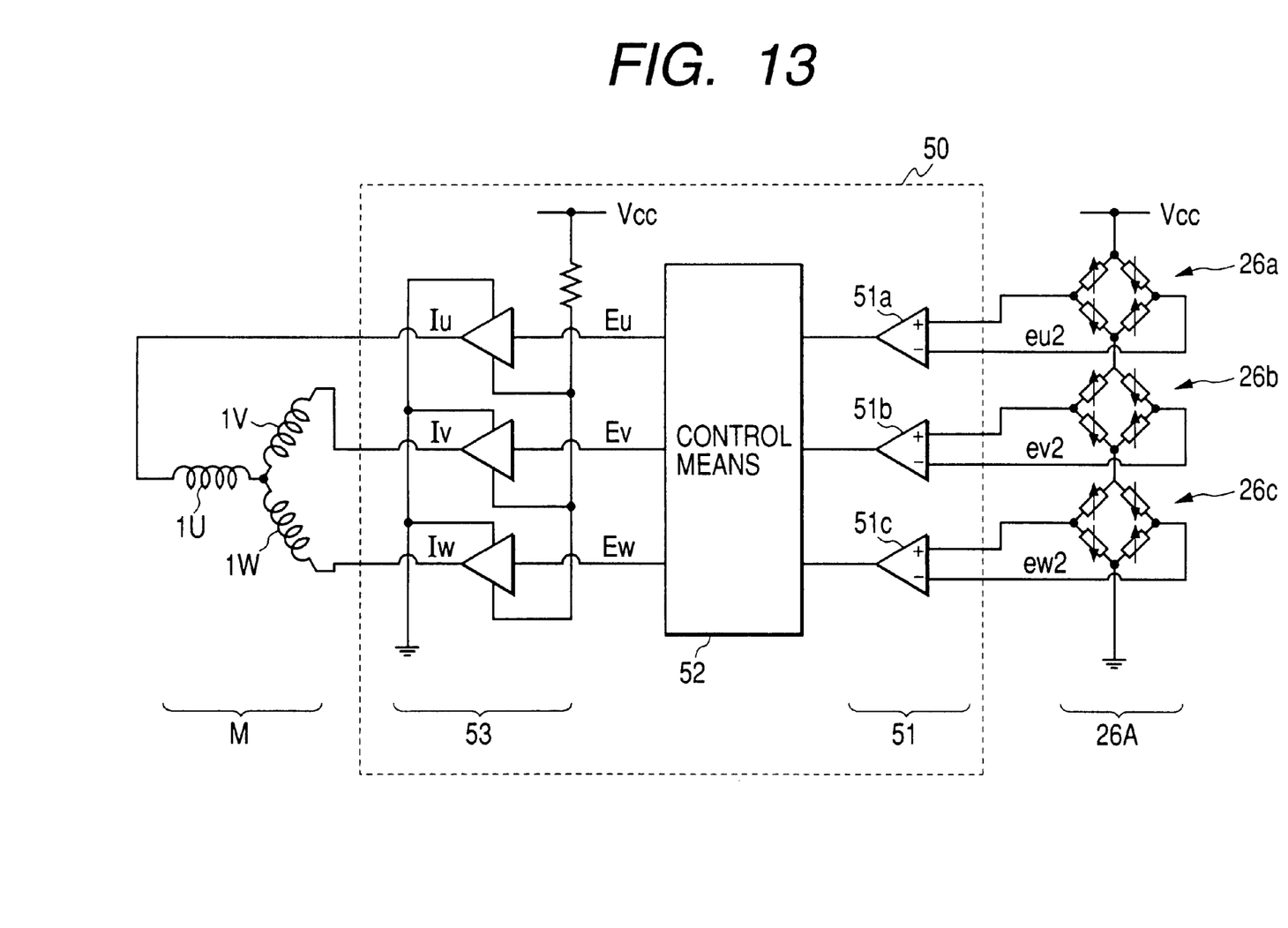
FIG. 13 is a structural view showing a driving device for a three-phase motor in the case of the magnetoresistance effect element sensor of FIG. 10.

Next, the description will be made of a driving device for a three-phase motor using the magnetoresistance effect element sensor 26.

FIG. 13 is a structural view showing a driving device for a three-phase motor using the magnetoresistance effect element sensor bridge-connected.

The driving device for a three-phase motor shown in FIG. 13 is formed of detection means 26A and driving means 50. The detection means 26A is constructed of the magnetoresistance effect element sensor 26. The magnetoresistance effect element sensor 26a detects the rotational speed or rotational phase of the U-phase of the three-phase motor. Similarly, the magnetoresistance effect element sensor 26b or 26c is capable of detecting the rotational speed or rotational phase of the V-phase or W-phase respectively.

The driving means 50 has a structure similar to the conventional driving means 2, and has voltage follower means 51, control means 52 and a phase current generating unit 53. The control means 52 can be constructed of, for example, driving signal generating means 40 shown in FIG. 8, and the phase current generating unit 53 is constructed of voltage-current conversion means composed almost exclusively of an operational amplifier.

When an external magnetic field acts on the detection means 26A of the driving device thus constructed, the equilibrium state of each of the magnetoresistance effect element sensors 26a, 26b, 26c is lost. As described above, such output signals e2 (eu2, ev2 and ew2) as shown in FIG. 12 are outputted respectively from each magnetoresistance effect element sensor 26a, 26b, 26c at this time.

In the driving means 50, by voltage-current converting these output signals e2 (eu2, ev2 and ew2) at predetermined timing, optimum phase currents Iu, Iv and Iw can be generated in each of the driving coils 1U, 1V and 1W of the three-phase motor as in the above-described conventional case. In this respect, as described above, the output signals e2 (eu2, ev2 and ew2) are at an output (amplitude) level twice the output signal e1 shown in FIG. 6 with zero level being centered. Therefore, in the driving means 50, since voltage-current conversion is performed on the basis of the output signals e2 (eu2, ev2 and ew2) at a higher output level than the driving device shown in FIG. 7, it is possible to generate phase current Iu, Iv and Iw with high accuracy, and to further maintain the rotational speed and rotational phase of the three-phase motor with high accuracy.

In this respect, in the foregoing, a description has been made of a driving device for a three-phase motor as an example of a polyphase motor, but the present invention is not limited to a case of the three-phase motor, and applicable to the other polyphase motors. In this case, the structure can be arranged such that a difference signal (driving signal) between output signals of magnetoresistance effect elements corresponding to two phases, which are adjacent each other, is determined, a phase current is generated from this difference signal, and this phase current is supplied to a phase on the side, on which the phase is leading, of the above-described two phases.

Also, in the foregoing, there has been shown a magnetoresistance effect element sensor 20 constructed such that power supply Vcc is connected to the land portion 23 and the land portion 25 is grounded, but the present invention is applicable, in addition to such a structure, to the one constructed such that plus power supply (+Vcc) is connected to the land portion 23, and minus power supply (−Vcc) is connected to the land portion 25. In the case of such a structure, any offset voltage (mid-point potential) can be caused not to be generated because the mid-point voltage is set to zero volt. Therefore, the output of the land portion 24 becomes a cosine wave having output amplitude, of ΔMR, with zero volt being centered. Thus, since the offset removing means 30 for the driving device shown in FIG. 7 is not required, it is possible to simplify the entire driving device for a polyphase motor.

Effect of the Invention

According to the present invention described above in detail, through the use of the magnetoresistance effect element for a sensor for detecting the rotational speed or rotational phase of the polyphase motor, it is possible to simplify the structure of the driving means for a polyphase motor.

Also, it is possible to render it less sensitive to the temperature characteristic, to obtain large output, and to maintain the rotational speed and phase of the polyphase motor with high accuracy.

Also, through the use of the magnetoresistance effect element, it can be constructed of one chip, and therefore, the outside dimensions of the entire polyphase motor can be prevented from being increased.

What is claimed is:

1. A driving device for a polyphase-motor, comprising:
   a polyphase motor having a rotor magnet and a stator having a plurality of driving coils, each driving coil corresponding to a phase of a plurality of phases of the polyphase motor, the rotor magnet rotating when each phase current of a plurality of phase currents is supplied to the stator;
   a magnetoresistance effect element sensor provided for each phase of the plurality of phases, each magnetoresistance effect element sensor to detect an output signal corresponding to a rotational phase of said rotor magnet and having an output signal with an offset voltage;
   an offset remover to remove the offset voltage of each output signal from said magnetoresistance effect element sensor;
   a driving signal generator to generate a difference signal between phases of said output signal corresponding to each phase of the polyphase motor, from which said offset voltage has been removed; and
   a phase current generator to generate phase current applied to the plurality of driving coils for each phase on the basis of said difference signal.

2. The driving device for a polyphase motor according to claim 1, each magnetoresistance effect element sensor comprising:
   a first magnetoresistance effect element; and
   a second magnetoresistance effect element connected in series with the first magnetoresistance effect element, the output signal of the magnetoresistance effect element sensor extracted from between the first magnetoresistance effect element and the second magnetoresistance effect element,
   said first magnetoresistance effect element having a fixed magnetic layer magnetized in one direction and a free magnetic layer having a direction of magnetization dependent on an external magnetic field, and
   said second magnetoresistance effect element having a fixed magnetic layer magnetized in a direction opposite to said one direction and a free magnetic layer having a direction of magnetization dependent on the external magnetic field,
   wherein
      said directions of magnetization of the fixed magnetic layers of said first and second magnetoresistance effect elements are parallel to a direction of a magnetic field of said rotor,
      a predetermined voltage is applied to said first and second magnetoresistance effect elements, and
      said offset remover has a subtracter for each magnetoresistance effect element sensor to subtract a reference voltage from the output signal of the magnetoresistance effect element sensor, each reference voltage set independently of the output signal of the magnetoresistance effect element sensor.

3. The driving device for a polyphase motor according to claim 1, said magnetoresistance effect element sensor comprising four magnetoresistance effect elements, the magnetoresistance effect elements bridge-connected on a substrate, each of said magnetoresistance effect elements having a fixed magnetic layer with a fixed direction of magnetization and a free magnetic layer having a direction of magnetization dependent on an external magnetic field,
   wherein of two sets of magnetoresistance effect elements which are located in opposed positional relationship to each other, the fixed magnetic layers of one set of the magnetoresistance effect elements are both magnetized in the same direction while the fixed magnetic layers of the magnetoresistance effect elements in the remaining set are both magnetized in a direction opposite to the fixed magnetic layers of said one set of magnetoresistance effect elements,
   the directions of magnetization of said fixed magnetic layers of said two sets of magnetoresistance effect elements, which are opposite to each other, are parallel to a direction of the magnetic field of said rotor and a predetermined voltage is applied to said bridge-connected magnetoresistance effect, and
   said offset remover has a subtracter to subtract a mid-point potential of one series-connected portion of the bridge-connected magnetoresistance effect elements from a mid-point potential of another series-connected portion of the bridge-connected magnetoresistance effect elements.

4. The driving device for a polyphase motor according to claim 1, said polyphase motor being a three-phase motor comprising a U-phase, a V-phase and a W-phase, and said driving signal generator generating, when one of said U-phase, V-phase and W-phase is set to a first phase, a difference signal between an output signal from the magnetoresistance effect element sensor obtained by detecting from the first phase and an output signal from the magnetoresistance effect element sensor obtained by detecting from a second phase, the second phase selected from the U-phase, V-phase and W-phase, adjacent said first phase and lagging the first phase by a phase difference of 120°.

5. A driving device for a polyphase motor, comprising:

a polyphase motor having a rotor magnet and a stator having a plurality of driving coils, each driving coil corresponding to a phase of a plurality of phases of the polyphase motor, the rotor magnet rotating when each phase current of a plurality of phase currents is supplied to the stator;

a magnetoresistance effect element sensor provided for each phase of the plurality of phases, each magnetoresistance effect element sensor to detect an output signal corresponding to a rotational phase of said rotor magnet and having an output signal with an offset voltage;

a driving signal remover to remove the offset voltage of each output signal from said magnetoresistance effect element sensor and to generate a difference signal between phases of said output signal corresponding to each phase of the polyphase motor, from which said offset voltage has been removed; and a phase current generator to generate phase current applied to the plurality of driving coils for each phase on the basis of said difference signal.

6. The driving device for a polyphase motor according to claim 5, said polyphase motor being a three-phase motor comprising a U-phase, a V-phase and a W-phase, said magnetoresistance effect element sensor comprising a first magnetoresistance effect element and a second magnetoresistance effect element connected in series, said magnetoresistance effect element sensor connected with the driving signal remover at a mid-point between the first magnetoresistance effect element and a second magnetoresistance effect element, said first magnetoresistance effect element having a fixed magnetic layer magnetized in one direction and a free magnetic layer having a direction of magnetization dependent on an external magnetic field, and said second magnetoresistance effect element having a fixed magnetic layer magnetized in a direction opposite to said one direction and a free magnetic layer having a direction of magnetization dependent on the external magnetic field, wherein said directions of magnetization of the fixed magnetic layers of said first and second magnetoresistance effect elements are opposite to each other and are parallel to a direction of a magnetic field of said rotor, and a predetermined voltage is applied to the first and second magnetoresistance effect elements, and said driving signal generator comprises, when one of said U-phase, V-phase and W-phase is set to a first phase, a subtractor to subtract a difference signal between an output signal from a mid-point of the magnetoresistance effect element sensor obtained by detecting from the first phase and an output signal from a mid-point of another magnetoresistance effect element sensor obtained by detecting from a second phase, the second phase selected from the U-phase, V-phase and W-phase, adjacent said first phase and lagging the first phase by a phase difference of 120°.

7. A driving device for a polyphase motor according to claim 6, wherein said magnetoresistance effect element is a spin-valve element.

8. A driving device for a polyphase motor according to claim 6, wherein said magnetoresistance effect element is a tunnel MR element.

* * * * *